June 25, 1935.  W. MARKERT  2,006,107

MACHINE FOR CUTTING THIN LEAVES

Filed Dec. 14, 1933   2 Sheets-Sheet 1

Inventor
Walter Markert
By E. F. Wenderoth
Atty

June 25, 1935.  W. MARKERT  2,006,107
MACHINE FOR CUTTING THIN LEAVES
Filed Dec. 14, 1933   2 Sheets-Sheet 2
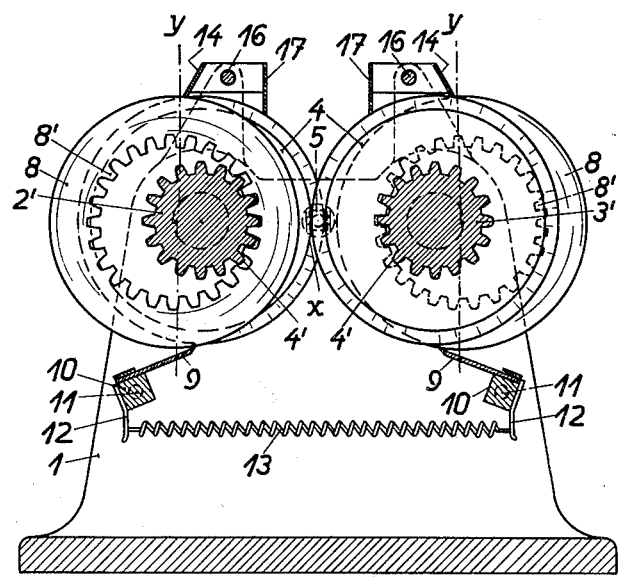
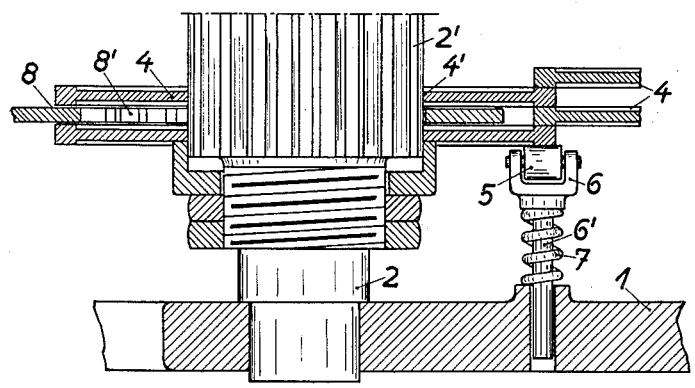
Inventor
Walter Markert
By
E. F. Wenderoth
Atty Patented June 25, 1935

2,006,107

UNITED STATES PATENT OFFICE 2,006,107

MACHINE FOR CUTTING THIN LEAVES

Walter Markert, Dresden, Germany, assignor to "Universelle" Cigarettenmaschinen-Fabrik, J. C. Müller & Co., Dresden, Germany Application December 14, 1933, Serial No. 702,395
In Germany April 24, 1933

7 Claims. (Cl. 146—122)

Machines are known for cutting thin leaves, particularly tobacco, into narrow strips or pieces, involving the co-operation of two interengaging sets of rotating cutter discs. Between each two adjacent cutter discs there is disposed an annular distance piece. The members of a set, which set is non-rotatably mounted on its shaft, are adapted to be drawn together axially.

On the shredding or cutting of the material, the cut particles often settle on the edges of the cutter discs. The juice which is produced by the cutting pressure also adheres firmly at this position. In order that the parts of the leaves and other adhering parts may be removed from the cutter discs, that is to say that the cut material may be ejected, it has already been proposed to place an eccentric ring on the annular distance pieces between each two adjacent cutter discs, the edges of which act on the edges of the cutters. The cut material is removed and ejected in that the eccentric periphery of the ejector rings gradually protrudes beyond the edge of the cutter discs.

Use is also made of this arrangement in the machine acording to the present invention. Whereas, however, in the known machine the ejector rings are stationary, the ejector rings according to this invention are of a greater internal diameter than the annular or undulatory member located between the two cutter discs and are suspended loosely.

In this arrangement where the ejector rings, similarly to the rings in ring-lubrication, rest loosely on their shaft or the distance ring discs, these rings join in the rotation and at the same time a lateral displacement caused by the cut material takes place whereby the eccentric adjustment of the rings is effected and the desired result is obtained. At the same time, however, the great drawback of the possibility of stoppages due to particles of tobacco becoming jammed in, is avoided.

It is known from experience that with stationary eccentric rings the particles of tobacco which enter between the annular discs and the cutter discs remain in their position, they adhere to newly arriving particles whereby the cutter discs are displaced axially and the whole apparatus operates inaccurately and stoppages occur. The freely moving rings, however, leave free play between the edges of the disc cutters; consequently they can adjust themselves to all stresses which occur on passing through the material to be cut, and moreover experience has shown that the removal effect is considerably increased by the ejector rings which join in the rotation.

In order to ensure that the ejector rings shall be carried along in the rotation of the cutter shaft, the latter is provided with catches which co-operate with the inner edges of the ejector rings. The catches consist preferably of teeth on the periphery of the cutter shaft, and the stops of corresponding inner teeth on the ejector rings.

Now the teeth on the periphery of the cutter shaft may be so designed that the teeth and the gaps between the teeth run in the longitudinal direction of the shaft, in which case an inner set of teeth is provided on the central recess of the cutter discs, in such manner that when the discs are placed on the cutter shaft the teeth fit exactly in between one another. In this manner the cutter discs are mounted extremely firmly on this shaft without the use of special springs, cotters or the like, and at the same time the teeth of the cutter shaft act as a catch device for the ejector rings.

It is known to cause scrapers of suitably hardened steel to act on the periphery of cutter discs, the function of these scrapers being on the one hand to scrape off any adhering particles from the cut material or to scrape off any liquid from the cut material which may accumulate, but also on the other hand to serve simultaneously for grinding the softer cutter discs during rotation.

Use is also made of this arrangement in the present invention, but in this case scrapers which act on the periphery are provided for the cutter discs and also for the ejector rings. The result thereby attained is that not only are the peripheries of the cutter discs cleaned and at the same time ground, but also the peripheries of the ejector rings are always kept clean.

For the ejector rings there are provided two scrapers which act on their periphery, one of which engages near the upper point and the other near the lower point, but both engage on the same side of the vertical middle line of the rings passing through the culminating points, namely the side facing the opposite set of rings. This ensures a uniform pressure of the scrapers, insofar as they are effective in the range of the upper culminating point of the ejector rings and on the cutter discs, without the provision of special springs or the like.

One form of construction of the invention is illustrated in the annexed drawings. In these drawings:

Fig. 3 is a vertical longitudinal section along the line III—III of Fig. 2.

Fig. 4 is a partial horizontal section along the line IV—IV of Fig. 1 on a somewhat larger scale.

On the machine frame 1 there are provided bearings for two cutter shafts 2 and 3, on which are mounted the cutter discs 4. The two cutter shafts are arranged at such a distance apart that the cutter discs meet at the cutting position, namely in such manner that between two adjacent cutter discs mounted on one shaft there engages a cutter disc mounted on the other shaft.

Figure 1:
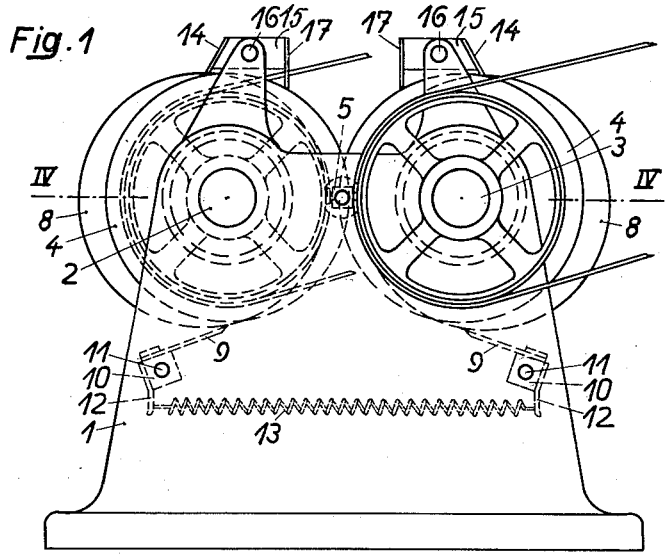
Fig. 1 is a side view.
Figure 2:
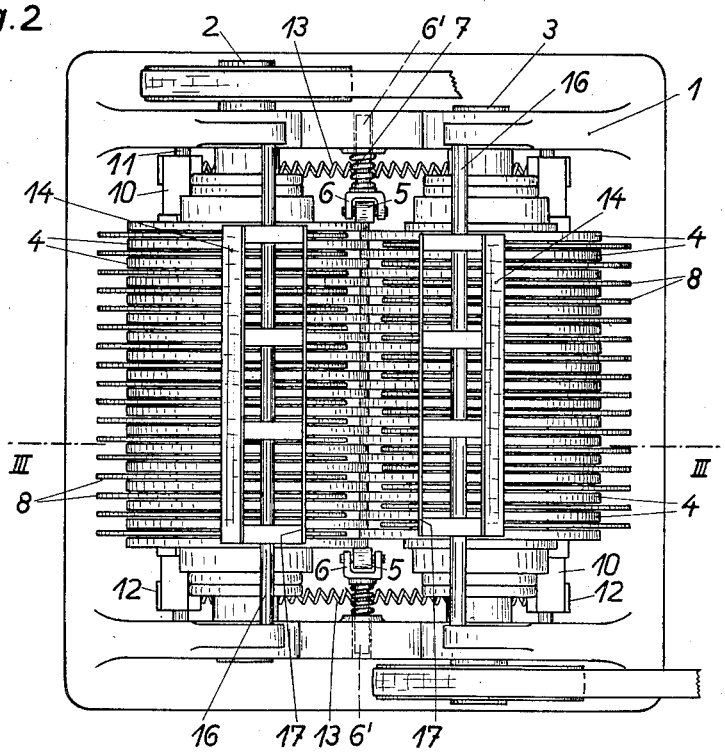
Fig. 2 is a plan thereof.

As is to be seen particularly from Fig. 2, on each shaft there is disposed a set of cutter discs which generally comprises a large number thereof. As may be seen particularly from Fig. 3, the annular cutter discs 4 are provided with internal teeth 4' which are designed to correspond to teeth 2' or 3' on the periphery of the cutter shafts 2 and 3. The teeth and the teeth spaces of the cutter shaft teeth 2', 3' are directed axially, so that the cutter discs 4 can be placed in position from the end of the shaft.

In the vicinity of the periphery the cutter discs 4 (cf. Fig. 4) are provided with reinforcements running right around them, and meeting at the cutting position. Here an axial compression of the set of cutter discs takes place in manner known per se, by means of axially acting pressure rollers 5. The rollers 5 are mounted in stirrups 6, the axles 6' of which are held in suitable borings in the side plates of the machine standard in such manner as to be axially displaceable. The springs 7 placed on the axles 6' tend to move the two rollers 5 towards each other.

Between the cutter discs 4, mounted in spaced manner on the cutter shafts 2 and 3, there are arranged ejector rings 8. These rings, which are provided with a greater opening having inner teeth 8' than that of the cutter discs 4, are suspended on the shafts 2 and 3 respectively. The teeth provided on the shafts 2 and 3 co-operate with the teeth of the ejector rings whereby, when the cutter shaft is rotated, the ejector rings are also set in rotation.

In order to ensure that the loosely suspended ejector rings 8 may be held in the necessary eccentric position, restraining rollers may be provided which press on the periphery of the ejector rings in such manner that these rings arrive in the desired eccentric position.

If, however, the scrapers described below are fitted, which serve not only to scrape off any particles of the cut material and any accumulated liquid from the cut material which adhere, but also serve simultaneously to grind the softer cutter discs during the rotation, then the restraining rollers mentioned above may be omitted.

In the vicinity of the lower point of the ejector rings there are provided scrapers 9 which are attached to bars 10. The latter are rotatably mounted on the machine frame by means of pivots 11. On the bars there are provided downwardly projecting extensions 12 with which a tension spring 13 engages. This tension spring 13 tends to cause the scrapers 9 to bear against the ejector rings 8.

It is preferable not to provide a scraper for each ejector, but to give the scrapers 9, 9 the form of a continuous bar extending axially over the whole set, which is known per se.

The scrapers 9 engage near the lower culminating point of the ejector rings 8 and further scrapers 14 are provided which engage near the upper culminating point of the ejector rings, at their peripheries. These scrapers 14, 14 are also in the form of axial, continuous bars in order that they shall engage simultaneously with all the ejector rings of the set disposed on the shaft 2 or 3.

It should be noted that the points of engagement of the scrapers 9 and 14 in relation to the vertical median plane $y$ of the rings 8, indicated by chain lines, are both on the same side, namely on the side facing the cutting position $x$. The result thereby obtained is that the rings are constantly pressed outwards by the scraper action, that is to say brought into engagement with the teeth 2', 3' of the cutter shafts 2, 3, thus leaving between them the necessary space for the passage of the cut material.

The scrapers 14 are pivoted on axial bars 16, each of which carries a second scraper 17. The latter scrapers bear against the peripheries of the cutter discs.

In consequence of the arrangement of the two scrapers 14, 17 on the pivotally mounted supports 15, it is possible to cause the scrapers to bear constantly and uniformly against the peripheries of the discs with which they co-operate, while avoiding inaccuracies or the like; the ejector rings 8 which are loosely suspended, that is to say flexibly suspended, tend to exert a spring pressure on the scrapers 14, whereby not only these scrapers but also the scrapers 17 are caused to bear against the cutter discs 4. Even when a relatively large number of cutter discs are arranged in parallel, side by side on the shafts 2, 3 and are pressed together to form a set, a uniform pressure of the scrapers everywhere is brought about in this manner.

In the forms of construction shown in the drawings the ejector rings are mounted loosely, directly on the toothed cutter shaft. It is of course possible to insert between the cutter discs, even the known annular distance discs with external teeth with which the internal teeth of the ejector rings engage.

Having thus described the nature of the said invention and the best means I know of carrying the same into practical effect, I claim:—

1. A cutting mechanism for shredding tobacco or the like comprising a series of intermeshing cutting disks, shafts upon which said disks are mounted, ejector rings loosely mounted and located between said cutter disks and means upon said shaft causing a positive rotation of said rings.

2. A cutting mechanism for shredding tobacco or the like comprising a series of intermeshing cutting disks, shafts upon which said disks are mounted, ejector rings loosely mounted and located between said cutter disks and cooperating means upon said shafts and rings causing a positive rotation of said rings.

3. A cutting mechanism for shredding tobacco or the like comprising a series of intermeshing cutting disks, shafts upon which said disks are mounted, ejector rings loosely mounted and located between said cutter disks, teeth provided upon said shafts and teeth provided upon said ejector rings cooperating with the teeth upon said shafts for causing a rotation of said rings.

4. A cutting mechanism for shredding tobacco or the like comprising a series of intermeshing cutting disks, shafts upon which said disks are mounted, ejector rings loosely mounted and located between said cutter disks and resiliently urged means for maintaining said ejector rings eccentric to said cutter disks.

5. A cutting mechanism for shredding tobacco or the like comprising a series of intermeshing cutting disks, shafts upon which said disks are mounted, ejector rings loosely mounted and located between said cutter disks and resiliently urged means for maintaining said ejector rings eccentric to said cutter disks and away from the intermeshing portions of said cutter disks.

6. A cutting mechanism for shredding tobacco or the like comprising a series of intermeshing cutting disks, ejector rings loosely mounted and located between said cutter disks, a rotary bar located adjacent said rings and disks, a pair of scraping members mounted upon said bar, one of said members contacting said ejector rings and the other member contacting a plurality of cutting disks.

7. A cutting mechanism for shredding tobacco or the like comprising a set of cutting disks, a second set of cutting disks intermeshing the disks of said first set, ejector rings loosely mounted and located between adjacent cutter disks in both sets of cutter disks, pivotally mounted scraping means contacting the lower portions of the ejector rings in each set and pivotally mounted scraping means contacting the upper portions of the ejector rings and cutting disks in each set so as to scrape adhering particles from the ejector rings, maintain said ejector rings eccentric to said cutting disks and bear against the peripheries of the cutting disks in each set.

WALTER MARKERT.